(12) United States Patent
Akita et al.

(10) Patent No.: US 10,240,641 B2
(45) Date of Patent: Mar. 26, 2019

(54) POWER TRANSMISSION SHAFT AND PROPELLER SHAFT FOR VEHICLE

(71) Applicant: HITACHI AUTOMOTIVE SYSTEMS KYUSHU, LTD., Chikujo-gun, Fukuoka (JP)

(72) Inventors: Yasushi Akita, Atsugi (JP); Hiromichi Komai, Hadano (JP); Masashi Kubo, Atsugi (JP)

(73) Assignee: HITACHI AUTOMOTIVE SYSTEMS KYUSHU, LTD., Chikujo-Gun (JP)

( * ) Notice: Subject to any disclaimer, the term of this patent is extended or adjusted under 35 U.S.C. 154(b) by 754 days.

(21) Appl. No.: 14/826,640

(22) Filed: Aug. 14, 2015

(65) Prior Publication Data

US 2016/0084317 A1 Mar. 24, 2016

(30) Foreign Application Priority Data

Sep. 18, 2014 (JP) ................................ 2014-189596

(51) Int. Cl.
| | |
|---|---|
| *F16D 1/10* | (2006.01) |
| *B60K 17/22* | (2006.01) |
| *F16C 3/02* | (2006.01) |
| *F16D 3/06* | (2006.01) |
| *F16D 3/84* | (2006.01) |

(52) U.S. Cl.
CPC ............. *F16D 1/10* (2013.01); *B60K 17/22* (2013.01); *F16C 3/023* (2013.01); *F16D 3/06* (2013.01); *F16D 3/84* (2013.01); *F16D 2001/103* (2013.01)

(58) Field of Classification Search
CPC ..... F16D 1/02; F16D 1/10; F16D 3/06; F16D 9/00; F16D 9/06; F16D 2001/103; F16C 3/03; Y10T 403/11; Y10T 403/559; Y10T 403/7026; Y10T 403/7033
USPC .......................... 464/179, 30, 32; 403/DIG. 3
See application file for complete search history.

(56) References Cited

U.S. PATENT DOCUMENTS 1,541,007 A * 6/1925 Thiemer ................... F16D 3/06
403/359.5

FOREIGN PATENT DOCUMENTS

| JP | S52-077135 U | 6/1977 |
|---|---|---|
| JP | S60-079095 U | 6/1985 |
| JP | H05-014624 U | 2/1993 |
| JP | H08-145069 A | 6/1996 |

(Continued)

*Primary Examiner* — Matthieu F Setliff
(74) *Attorney, Agent, or Firm* — Foley & Lardner LLP

(57) ABSTRACT

A power transmission shaft has a shaft member having, on an outer peripheral surface thereof, a male spline; a cylindrical member having, on an inner peripheral surface thereof, a female spline; and a seal member provided in a pressed state between an outer peripheral seal surface formed on the outer peripheral surface of the shaft member and an inner peripheral seal surface formed on the inner peripheral surface of the cylindrical member. The cylindrical member is spline-engaged with the shaft member by one end side of the shaft member being inserted into the cylindrical member from an other end side of the cylindrical member. Axial direction shock is absorbed by sliding of the splines. The outer peripheral seal surface is positioned at the other end side with respect to the male spline, and the inner peripheral seal surface is positioned at the other side with respect to the female spline.

30 Claims, 7 Drawing Sheets

(56) References Cited

FOREIGN PATENT DOCUMENTS

JP          H 09-123774 A     5/1997

* cited by examiner

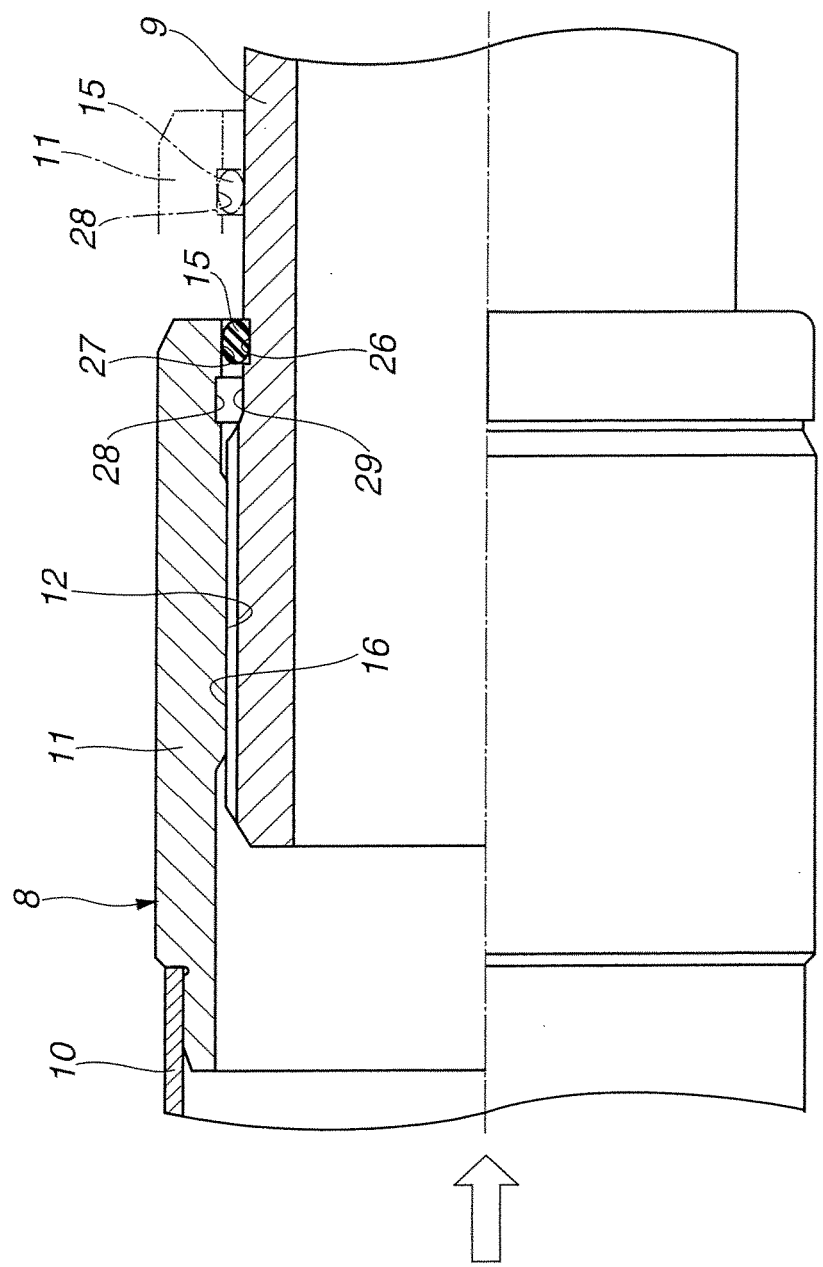

POWER TRANSMISSION SHAFT AND PROPELLER SHAFT FOR VEHICLE

BACKGROUND OF THE INVENTION

The present invention relates to an improvement of a power transmission shaft and a propeller shaft that transmit power from a transmission to a driving wheel of a vehicle.

In recent years, there have been proposed and developed various power transmission shafts (propeller shafts). For example, Japanese Patent Application Publication No. 09-123774 (hereinafter is referred to as "JPH09-123774") discloses in (FIG. 3) a power transmission shaft (a propeller shaft) mounted on a vehicle. The power transmission shaft (the propeller shaft) disclosed in JPH09-123774 has a cylindrical member whose axial direction front end portion is connected to a transmission side of the vehicle and a shaft member whose axial direction rear end portion is connected to a differential carrier side and which is connected to the cylindrical member from an axial direction.

The cylindrical member is provided, on an inner peripheral surface of a rear end portion thereof, with a female spline. The shaft member is provided, on an outer peripheral surface of a front end portion thereof, with a male spline that is inserted into and engaged with the female spline from the axial direction. By the fact that the both splines are engaged from the axial direction, when an excessive input-load is exerted on the cylindrical member from the transmission, for example, upon a collision of the vehicle, the cylindrical member relatively moves toward a direction of the shaft member through the both splines, then shock or impact is lessened.

Further, an inner peripheral seal surface is formed on the inner peripheral surface of the cylindrical member at a tip end side with respect to the female spline of the rear end portion of the cylindrical member. On the other hand, an annular seal groove is formed on the outer peripheral surface of the shaft member at the rear end portion side of the male spline located at the front end portion of the shaft member. Then, a ring-shaped seal ring (a ring-shaped seal member) is provided and an inner peripheral portion of the seal ring is fitted and fixed in the annular seal groove. This ring-shaped seal member is formed as a single-piece ring, and is made of material such as synthetic rubber. An outer peripheral portion of the ring-shaped seal member contacts the inner peripheral seal surface of the cylindrical member by a predetermined elastic force, thereby sealing a contact portion between the shaft member and the cylindrical member.

SUMMARY OF THE INVENTION

However, in a power transmission shaft disclosed in JPH09-123774, the seal member is fitted and fixed in the annular seal groove that is formed at a rear end side with respect to the male spline of the shaft member. Because of this, when the input-load is exerted on the cylindrical member from the transmission and the cylindrical member moves and retracts relatively to the shaft member through the both splines, the seal member is caught in the female spline of the cylindrical member.

As a result, a sliding (movement) resistance between the both splines becomes large, and a smooth movement in a retracting direction of the cylindrical member relative to the shaft member cannot be obtained. This might deteriorate a shock absorbing performance.

The present invention was made in view of the above technical problem. An object of the present invention is therefore to provide a power transmission shaft which is capable of suppressing lowering of the shock absorbing performance by suppressing the increase of the sliding resistance due to the seal member being caught between the both splines at a time of the retracting movement of the cylindrical member relative to the shaft member.

According to one aspect of the present invention, a power transmission shaft comprises: a shaft member having, on an outer peripheral surface of the shaft member, a male spline; a cylindrical member having, on an inner peripheral surface of the cylindrical member, a female spline, the cylindrical member being spline-engaged with the shaft member by one end side of the shaft member being inserted into the cylindrical member from an other end side of the cylindrical member, and an axial direction shock being absorbed by sliding of the splines; and a seal member provided in a pressed state between an outer peripheral seal surface formed on the outer peripheral surface of the shaft member and an inner peripheral seal surface formed on the inner peripheral surface of the cylindrical member. The outer peripheral seal surface is positioned at the other end side with respect to the male spline, and the inner peripheral seal surface is positioned at the other side with respect to the female spline.

According to another aspect of the present invention, a power transmission shaft comprises: a shaft member having, on an outer peripheral surface of the shaft member, a male spline; a cylindrical member having, on an inner peripheral surface of the cylindrical member, a female spline that is engaged with the male spline; a length adjusting portion that adjusts a length of a spline-engagement of the male and female splines in an axial direction; a seal member having a sealing effect, the seal member provided in a pressed state between an outer peripheral seal surface formed on the outer peripheral surface of the shaft member and an inner peripheral seal surface formed on the inner peripheral surface of the cylindrical member; and a sealing effect removal portion that removes the sealing effect of the seal member when the sliding length is adjusted by the length adjusting portion.

According to a further aspect of the invention, a propeller shaft for a vehicle comprises: a cylindrical member whose one end side is connected to the vehicle through a first joint member, the cylindrical member having, on an inner peripheral surface of the cylindrical member, a female spline; a shaft member whose other end side is connected to the vehicle through a second joint member, the shaft member having, on an outer peripheral surface of the shaft member, a male spline that is engaged with the female spline, the cylindrical member and the shaft member being spline-engaged with each other by one end side of the shaft member being inserted into the cylindrical member, and a length of the spline-engagement being adjusted by sliding of the splines in an axial direction in response to an input from a direction of the first or second joint member; and a seal member provided in a pressed state with a predetermined tightness between an outer peripheral seal surface formed on the outer peripheral surface of the shaft member and an inner peripheral seal surface formed on the inner peripheral surface of the cylindrical member. When the splines relatively slide in the axial direction, the seal member contacts at least one of the inner and outer peripheral seal surfaces with a smaller tightness than the predetermined tightness.

According to the present invention, it is possible to prevent the annular seal member from being caught in the splines at a time of the movement of the cylindrical member relative to the shaft member in a retracting direction. The lowering of the shock absorbing performance can therefore be suppressed.

BRIEF DESCRIPTION OF THE DRAWINGS

FIG. 7 is an enlarged longitudinal sectional view showing a main part of a fifth embodiment.

DETAILED DESCRIPTION OF THE INVENTION

In the following, embodiments in which a power transmission shaft according to the present invention is applied to a propeller shaft for a vehicle will be explained with reference to the drawings.

Figure 2:
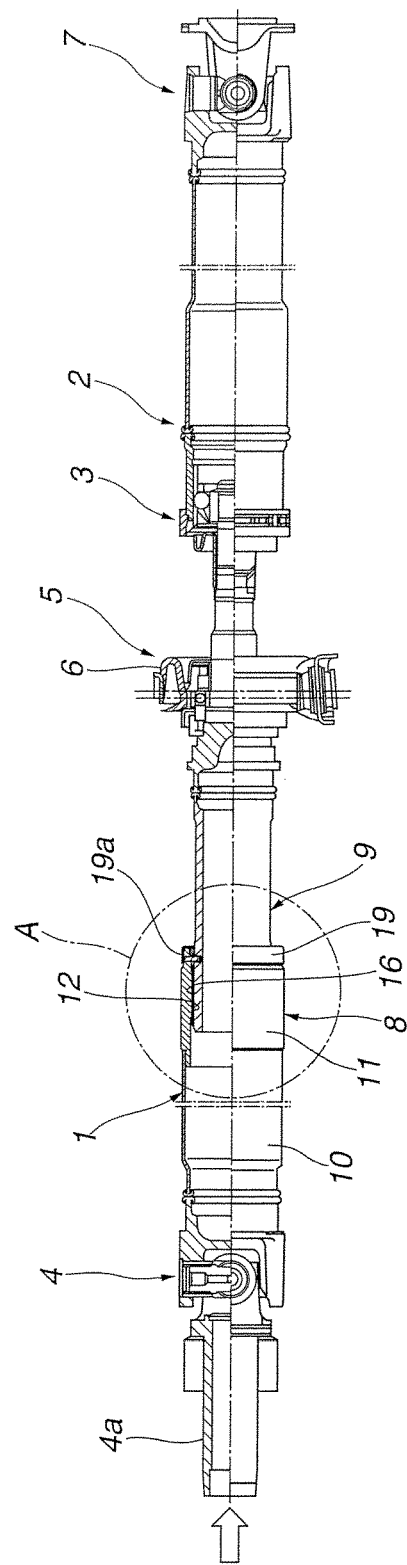
FIG. 2 is a general side view of a propeller shaft for a vehicle according to the first embodiment.

As shown in FIG. 2, the propeller shaft for the vehicle has a first shaft 1 on a vehicle front side and a second shaft 2 on a rear side. The first shaft 1 and the second shaft 2 are connected together through a constant velocity universal joint 3. A front end portion of the first shaft 1 is connected to a transmission (not shown) through a first cross joint 4 that is a first joint mechanism and a transfer shaft 4a, while a rear end portion of the first shaft 1 is provided with a center bearing 5. The center bearing 5 is elastically supported by a bearing support 6 that is fixed to the vehicle, overall deflection of the propeller shaft is then suppressed. A rear end portion of the second shaft 2 is connected to an input shaft of a rear differential gear (not shown) through a second cross joint 7 that is a second joint mechanism.

Figure 1:
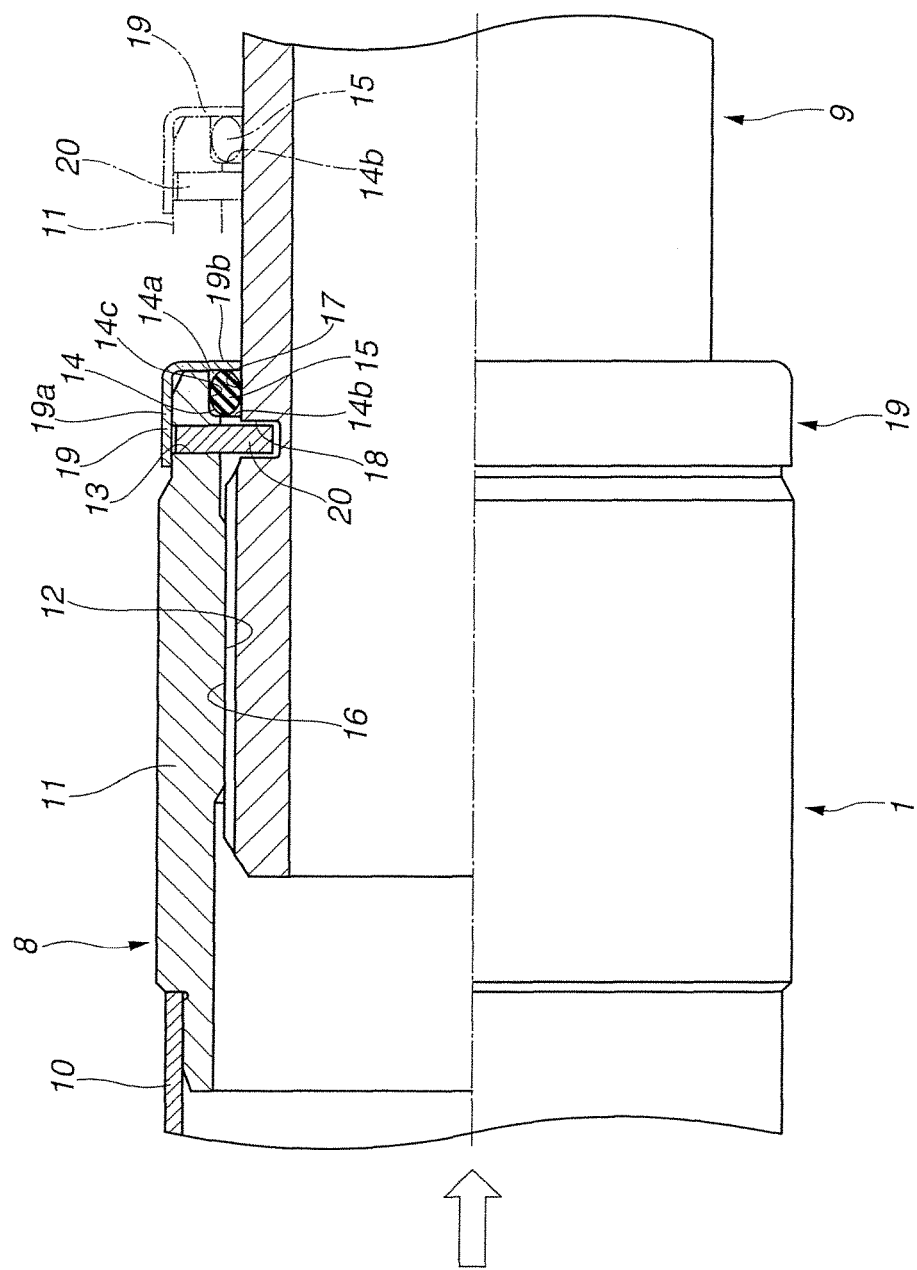
FIG. 1 is an enlarged view of A part of FIG. 2, showing a first embodiment.

As shown in FIG. 1, the first shaft 1 is divided into two parts in an axial direction by a front side shaft 8 as a cylindrical member that is a front side of the first shaft 1 and a cylindrical rear side shaft 9 as a shaft member that is a rear side of the first shaft 1.

The front side shaft 8 has a thin first tube 10 that is joined to the first cross joint 4 by friction welding and a relatively thick metal-made second tube 11 that is joined to the first tube 10 from the axial direction by welding.

A female spline 12 is formed along the axial direction on an inner peripheral surface at a rear end portion of the second tube 11 on the rear side shaft 9 side. An inner peripheral seal surface is formed on the inner peripheral surface of the second tube 11 at a rear end side with respect to the female spline 12. Further, between the female spline 12 and the inner peripheral seal surface, a first engaging hole 13 is formed by penetrating the second tube 11 along a radial direction. An annular seal groove 14 to which a seal ring 15 as a seal member is fitted and fixed is formed in a rear end side position with respect to the first engaging hole 13, i.e. a position of the inner peripheral seal surface.

The annular seal groove 14 is formed by annularly cutting the inner peripheral surface of the second tube 11 from the vicinity of the first engaging hole 13 to a rear end edge. An opening portion 14a is then formed at the rear end edge. An outer peripheral portion of the seal ring 15 is accommodated and held in a bottom surface 14c of the annular seal groove 14.

On the other hand, the rear side shaft 9 is made of metal material, and is formed as a single-piece shaft into a cylindrical shape having a substantially uniform outer diameter. A male spline 16 that is a large diameter portion is formed along the axial direction on an outer peripheral surface at a front end portion of the rear side shaft 9. The male spline 16 is inserted to the female spline 12 from the axial direction and engaged with the female spline 12. An annular outer peripheral seal surface 17 that is a middle diameter portion, which is smaller than an outer diameter of the male spline 16, is formed on the outer peripheral surface of the rear side shaft 9, where the male spline 16 is not formed, located at a rear end portion side of the male spline 16.

Further, between the male spline 16 and the outer peripheral seal surface 17, a closed bottomed second engaging hole 18 is formed along the radial direction of the rear side shaft 9. The second engaging hole 18 is provided so that when the rear side shaft 9 is inserted into the second tube 11 through the female and male splines 12 and 16, the second engaging hole 18 coincides with the first engaging hole 13 in the radial direction, and a retaining pin 20 is inserted from an outside opening end of the first engaging hole 13 into the second engaging hole 18 and placed between the first engaging hole 13 and the second engaging hole 18.

The retaining pin 20 is made of metal material. The retaining pin 20 is press-fixed to both of the engaging holes 13 and 18 after the rear side shaft 9 is inserted into the second tube 11, then movement in a falling-out direction of the rear side shaft 9 from the second tube 11 is limited.

The seal ring 15 is made of synthetic rubber, and is formed as a single-piece ring into a ring-shape. As mentioned above, the outer peripheral portion of the seal ring 15 is held and fixed in the annular seal groove 14, and its axial direction movement to a direction of the first tube 10 is limited by an inside wall surface (an axial direction inside wall surface) 14b of the annular seal groove 14. Further, the axial direction movement of the seal ring 15 in an opposite direction to the direction of the first tube 10 is limited by a circular retainer 19 that closes the opening portion 14a.

The seal ring 15 is thus kept in a pressed state between the bottom surface 14c of the annular seal groove 14 and the outer peripheral seal surface 17.

The retainer 19 is made of, for example, iron-based metal material. The retainer 19 has a circular shape, and is shaped into a substantially L-shape in a cross section by bending. An outer peripheral portion 19a bent almost horizontally is press-fixed, from the axial direction, onto a small diameter step portion that is formed on an outer peripheral of the rear end portion of the second tube 11. Further, the outer peripheral portion 19a is fitted on the small diameter step portion so as to cover the outer peripheral side opening of the first engaging hole 13, thereby preventing unintentional fall-out of the retaining pin 20.

In addition, an inner peripheral portion 19b of the retainer 19, which is bent almost vertically upon the press-fixing, closes the opening portion 14a of the annular seal groove 14 from the axial direction, thereby suppressing come-out of the seal ring 15.

[Effect of the Present Embodiment]

When an excessive input-load is exerted on the front side shaft 8 of the first shaft 1 from the transfer shaft 4a side, i.e. from an axial direction left side shown by arrows in FIGS. 1 and 2, through the first cross joint 4, for example, upon a collision of the vehicle, a large moving force to a direction of the rear shaft 9 acts on the second tube 11 of the front side shaft 8 through the female spline 12 and the male spline 16.

A large force in a shearing direction of the retaining pin 20 then acts on the retaining pin 20 in a substantially middle position of its axial direction, and the retaining pin 20 is fractured from the substantially middle position of the axial direction of the retaining pin 20. Further, the female spline 12 slides on the male spline 16 in the axial direction, and the inner peripheral surface of the second tube 11 slides along the outer peripheral surface of the rear side shaft 9, then the front side shaft 8 moves in a retracting direction with respect to the rear side shaft 9.

At this time, as shown by a dashed line in FIG. 1, the outer peripheral portion of the seal ring 15 is pushed out in the axial direction by the inside wall surface 14b of the annular seal groove 14 with the axial direction movement of the front side shaft 8, and an inner peripheral portion of the seal ring 15 moves while slide-contacting the outer peripheral surface of the rear side shaft 9.

That is, the seal ring 15 smoothly slides on the outer peripheral surface of the rear side shaft 9 so as to separate from the male spline 16 in the axial direction opposite to the male spline 16. With this sliding, the seal ring 15 is not caught between the both splines 12 and 16.

Consequently, unlike the related art, since the seal ring 15 does not contribute to the sliding resistance when the front side shaft 8 slides with respect to the rear side shaft 9, the increase of the load is suppressed. Thus, lowering of the shock absorbing performance by the front side shaft 8 and the rear side shaft 9 can be sufficiently suppressed.

Moreover, the retainer 19 closes the opening portion 14a of the annular seal groove 14 and the opening end of the first engaging hole 13 at the same time. It is thus possible to stably hold the seal ring 15 with the inside wall surface 14b.

Therefore, an excellent sealing performance of the seal ring 15 can be kept and its durability is improved.

In addition, since the retaining pin 20 is disposed between the annular seal groove 14 and the female spline 12, when the front side shaft 8 moves in the axial direction, movement of the seal ring 15 can be limited by the retaining 20, too. Therefore, it is possible to further prevent the seal ring 15 from being caught between the both splines 12 and 16.

Furthermore, as explained above, the retainer 19 suppresses the unintentional fall-out of the retaining pin 20. Especially also when and after the retaining pin 20 is fractured, since the retainer 19 closes the opening end of the first engaging hole 13, it is possible to prevent a part of the fractured seal ring 15 from coming out to the outside.

Here, upon the movement of the front side shaft 8, the retainer 19 moves without an inner end edge of the inner peripheral portion 19b being in sliding-contact with the outer peripheral surface of the rear side shaft 9. Therefore, the retainer 19 does not contribute to the sliding resistance of the front side shaft 8.

Second Embodiment

Figure 3:
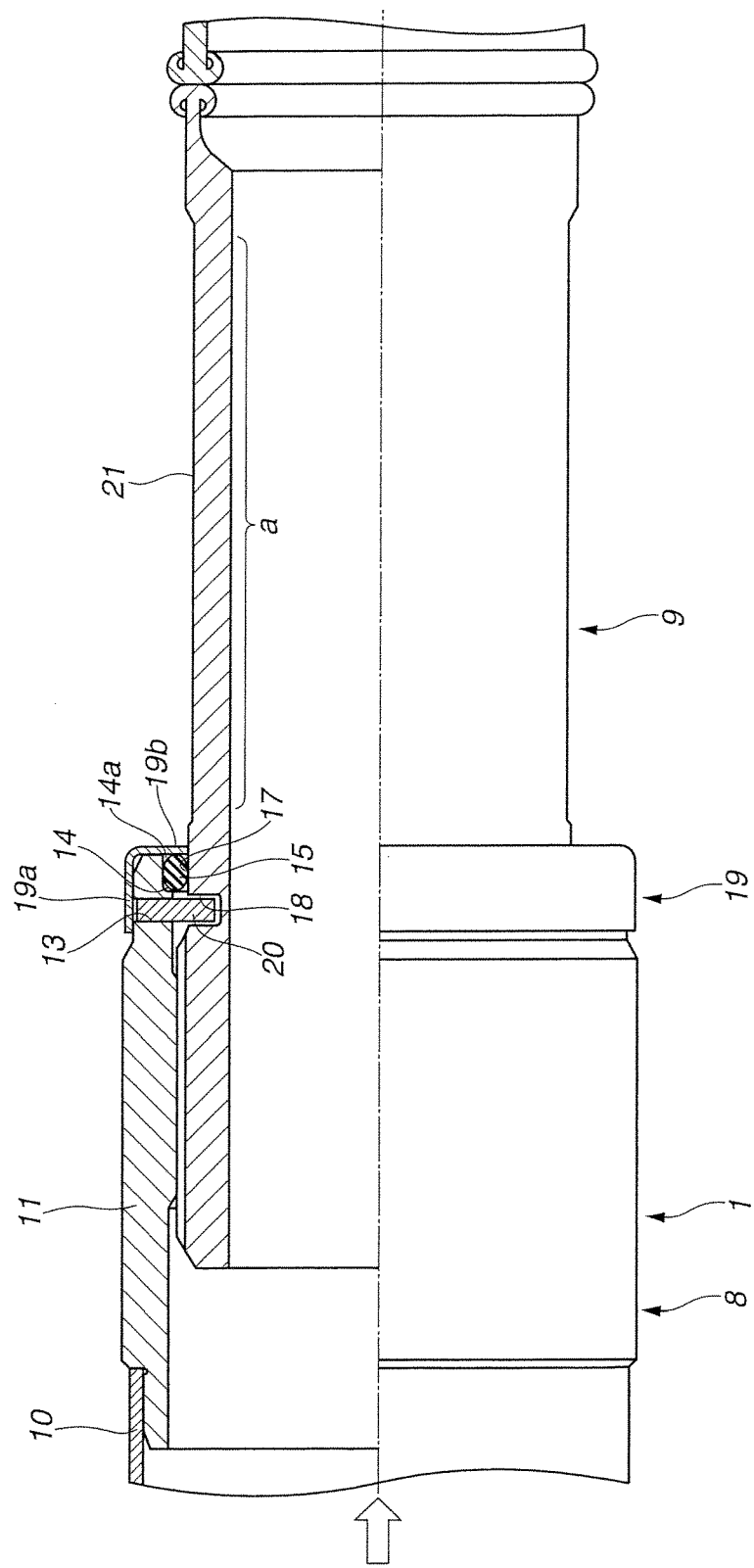
FIG. 3 is an enlarged semi-sectional view showing a main part of a second embodiment.

FIG. 3 shows a second embodiment of the present invention. A basic structure of the second embodiment is the same as the first embodiment. However, as a different structure, a non-seal surface 21 that is a small diameter portion having a smaller diameter than an outer diameter of the outer peripheral seal surface 17 is formed on the outer peripheral surface of the rear side shaft 9.

That is, the non-seal surface 21 is formed into a cylindrical shape having the smaller diameter than the outer diameter of the outer peripheral seal surface 17, and continues from one end edge position in the axial direction of the outer peripheral surface 17 to an almost all area "a" of the rear side shaft 9.

Therefore, as described above, when the excessive input-load is exerted on the front side shaft 8 of the first shaft 1 from an axial direction left side shown by an arrow in FIG. 3, for example, upon the collision of the vehicle, the large moving force to the direction of the rear side shaft 9 acts on the second tube 11 of the front side shaft 8 through the female spline 12 and the male spline 16. The large force in the shearing direction of the retaining pin 20 then acts on the retaining pin 20 in the substantially middle position of its axial direction, and the retaining pin 20 is fractured from the substantially middle position of the axial direction of the retaining pin 20. Further, the female spline 12 slides on the male spline 16 in the axial direction, and the inner peripheral surface of the second tube 11 slides along the outer peripheral surface of the rear side shaft 9, then the front side shaft 8 moves in the retracting direction with respect to the rear side shaft 9.

Figure 4:
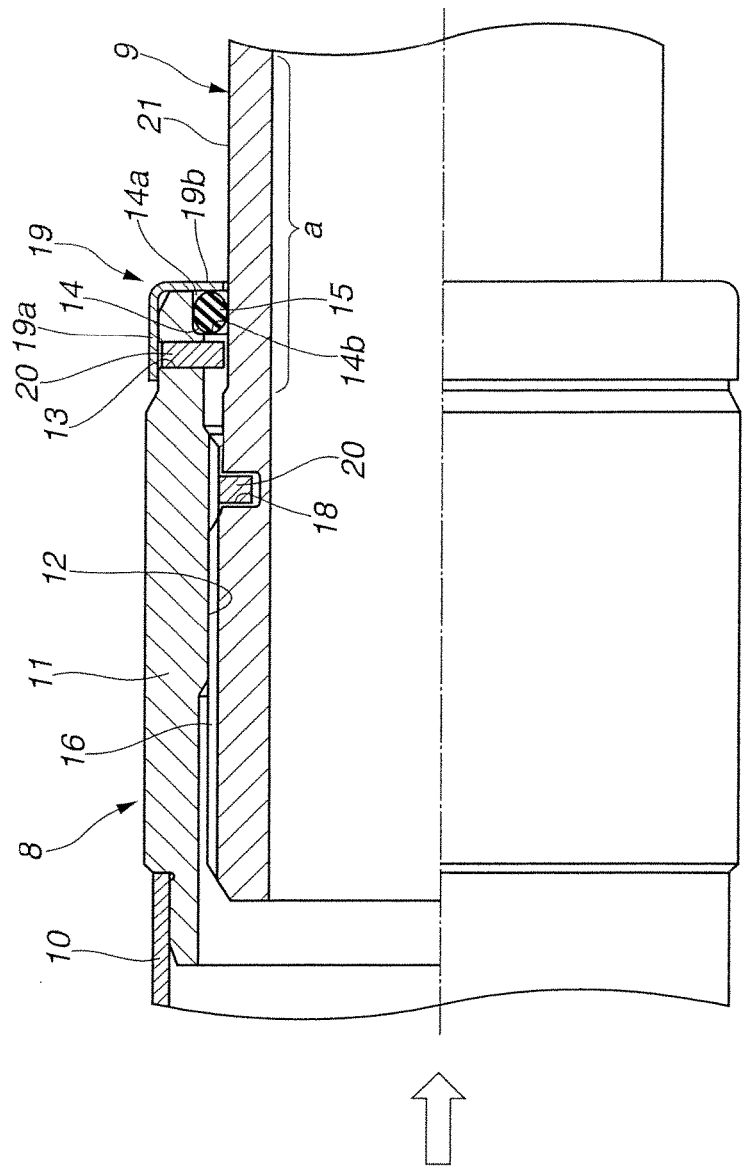
FIG. 4 is a longitudinal sectional view of the main part of the second embodiment, showing a state in which a front side shaft moves in an axial direction.

At this time, as shown in FIG. 4, the outer peripheral portion of the seal ring 15 is pushed out in the axial direction by the inside wall surface 14b of the annular seal groove 14 with the axial direction movement of the second tube 11, and the inner peripheral portion of the seal ring 15 moves and slides while slightly contacting the non-seal surface 21 of the rear side shaft 9.

That is, the seal ring 15 smoothly slides on the outer peripheral surface of the non-seal surface 21 of the rear side shaft 9 with almost no sliding resistance so as to separate from the male spline 16 in the axial direction opposite to the male spline 16. With this sliding, the seal ring 15 is not caught between the both splines 12 and 16.

Therefore, in the same manner as the first embodiment, since the seal ring 15 does not contribute to the sliding resistance when the front side shaft 8 slides with respect to the rear side shaft 9, the increase of the load is suppressed. Thus, lowering of the shock absorbing performance by the front side shaft 8 and the rear side shaft 9 can be sufficiently suppressed.

Particularly, in the second embodiment, upon the movement of the front side shaft 8 in the retracting direction, the seal ring 15 moves with almost no contact with the non-seal surface 21. Therefore, the shock absorbing performance by the front side shaft 8 and the rear side shaft 9 is further improved.

In addition, when the seal ring 15 is set into the annular seal groove 14, the male spline 16 of the rear side shaft 9 is inserted to the female spline 12 of the second tube 11 from the axial direction and both of the shafts 8 and 9 are previously connected together. Then, in this state, the seal ring 15 is inserted from a rear end side of the outer peripheral surface of the rear side shaft 9 and is fitted into the annular seal groove 14 by using an outer peripheral side of the non-seal surface 21. In this way, by using the outer peripheral side of the non-seal surface 21 having a small diameter, there is no sliding friction, that is, no tightness at the time of insertion. Therefore, an insertion work of the seal ring 15 becomes easy because a twist and a breakage of the seal ring 15 are suppressed, and the seal ring 15 is stably held in the annular seal groove 14. As a result, lowering of the sealing performance by the seal ring 15 can be suppressed.

Further, the non-seal surface 21 is formed continuously with the outer peripheral seal surface 17. Thus, it is possible to reduce the sliding resistance of the seal ring 15 immediately after the seal ring 15 starts sliding.

Furthermore, by providing the outer peripheral seal surface 17 in a position other than the male spline 16 of the rear side shaft 9, the sealing performance by the seal ring 15 can be improved. The other working and effects are the same as those of the first embodiment.

Third Embodiment

Figure 5:
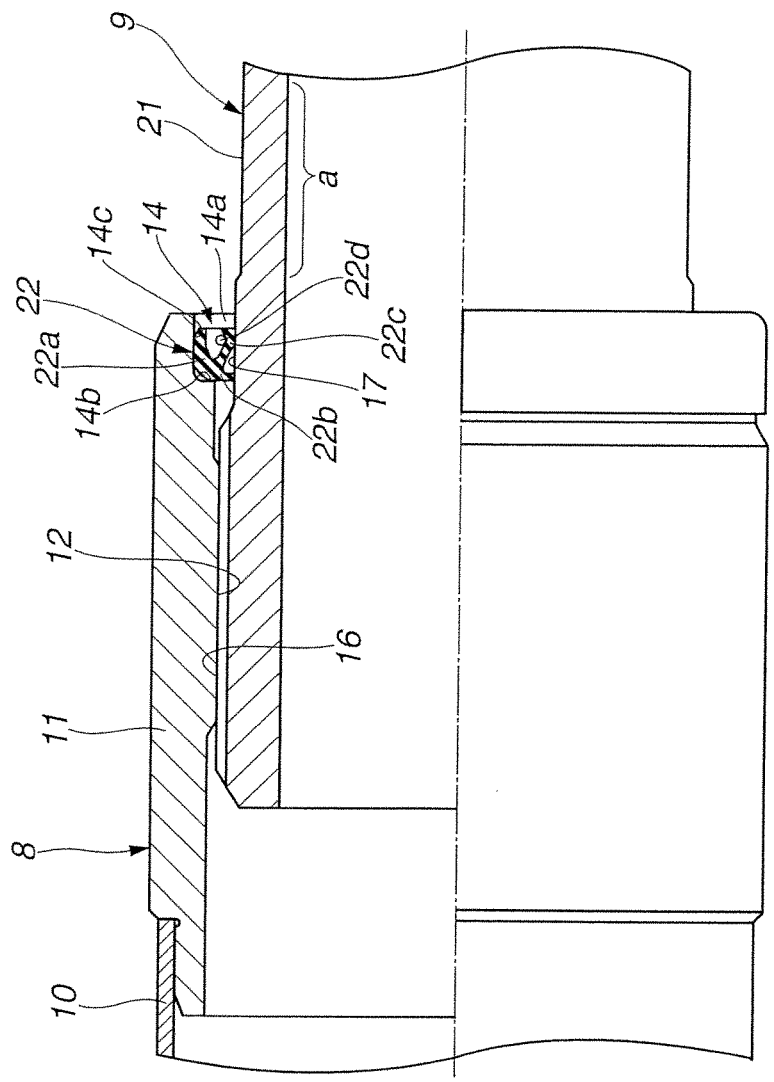
FIG. 5 is an enlarged longitudinal sectional view showing a main part of a third embodiment.

FIG. 5 shows a third embodiment of the present invention. A basic structure of the third embodiment is the same as the second embodiment. However, each of the engaging holes, the retaining pin and the retainer are not provided. Further, as the seal member, an oil seal 22 is used instead of the seal ring (o-shaped ring).

The oil seal 22 has a typical structure having a substantially bracket-shape in a cross section. The oil seal 22 has a circular base portion 22a which is press-fixed to the bottom surface 14c of the annular seal groove 14, a support portion 22b which is integrally formed with the base portion 22a and contacts the inside wall surface 14b and a seal portion 22c which is integrally formed with an inner peripheral side of the support portion 22b and contacts the outer peripheral seal surface 17 of the rear side shaft 9. The seal portion 22c is set so as to elastically contact the outer peripheral seal surface 17 all the time by a spring force of a backup spring 22d.

With this structure, according to the third embodiment, when the front side shaft 8 relatively moves in the axial direction with respect to the rear side shaft 9, in the same way as the second embodiment, the oil seal 22 is pushed out by the inside wall surface 14b of the annular seal groove 14, and the oil seal 22 moves to the outer peripheral surface of the non-seal surface 21. Therefore, it is possible to sufficiently prevent the oil seal 22 from being caught between the both splines 12 and 16. As a consequence, an excellent shock absorbing performance can be gained.

In addition, in the third embodiment, since the retaining pin and the retainer provided in each of the above embodiments can be omitted, it is possible to greatly improve manufacturing work and working efficiency of assembling.

Fourth Embodiment

Figure 6:
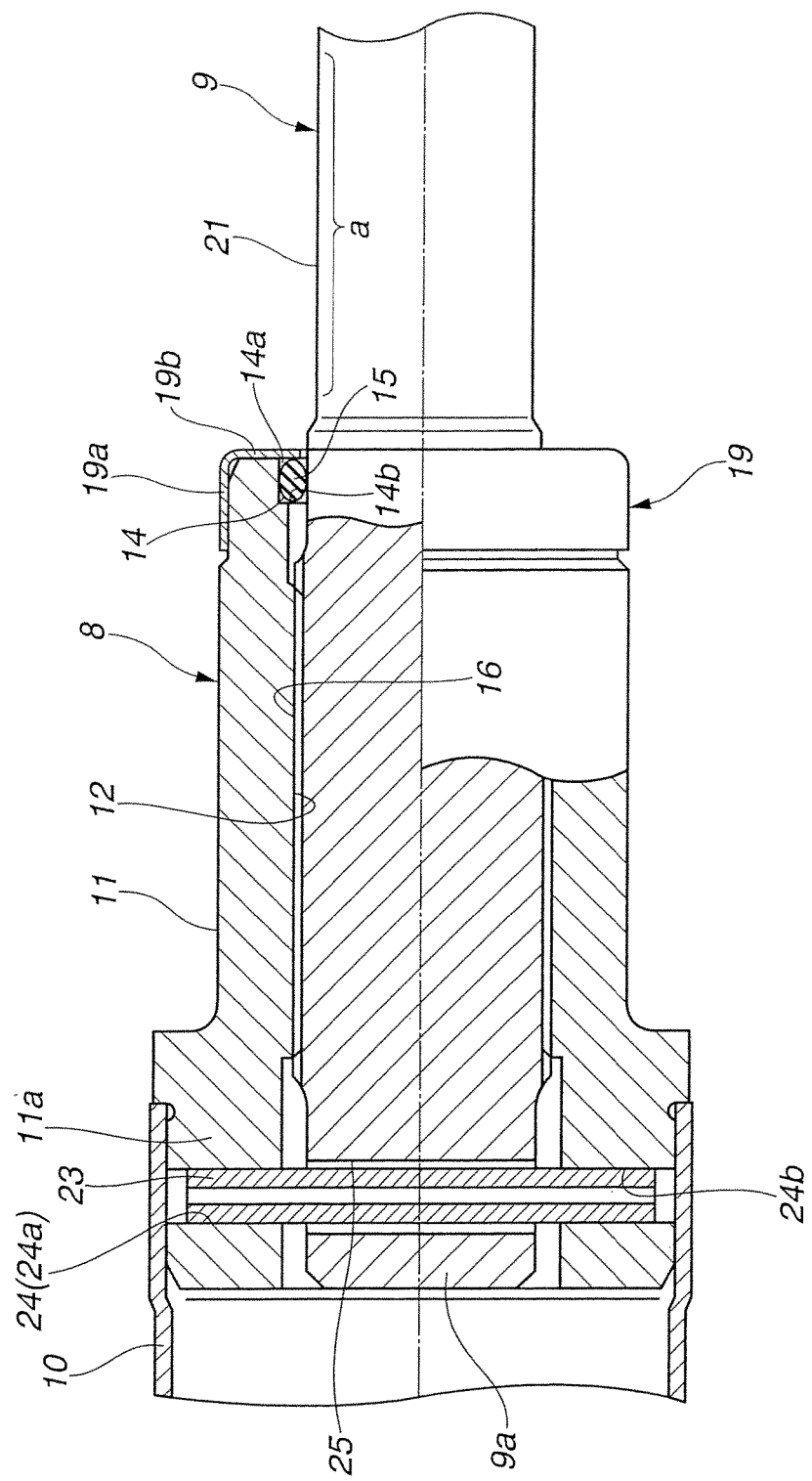
FIG. 6 is an enlarged longitudinal sectional view showing a main part of a fourth embodiment.

FIG. 6 shows a fourth embodiment. A basic structure of the fourth embodiment is the same as the second embodiment. However, in the fourth embodiment, a retaining pin 23 is provided at a front end portion 11a of the second tube 11 and a front end portion 9a of the rear side shaft 9.

That is, the retaining pin 23 is formed into a hollow cylindrical shape and a length of the retaining pin 23 is slightly smaller than an outer diameter of the front end portion 11a of the second tube 11.

The front end portion 11a of the second tube 11 has a large diameter and is formed to be thick. A first engaging hole 24 penetrates the front end portion 11a along a radially inward direction of the front end portion 11a. An inner diameter of the first engaging hole 24 is formed to be slightly larger than an outer diameter of the retaining pin 23 so that the retaining pin 23 is slightly press-fixed to the first engaging hole 24.

On the other hand, the inside of the rear side shaft 9 is formed to be a solid state. A second engaging hole 25 penetrates the front end portion 9a of the rear side shaft 9 along a radially inward direction of the small diameter front end portion 9a that is inserted up to an end of the second tube 11. An inner diameter of the second engaging hole 25 is formed to be larger than the outer diameter of the retaining pin 23 so that the retaining pin 23 is in a free fitting state (so that the retaining pin 23 is loosely fitted in the second engaging hole 25).

To connect and fix the retaining pin 23 to the rear side shaft 9 and the second tube 11, first, the front end portion 9a of the rear side shaft 9 is inserted into the second tube 11, and both of the engaging holes 24 and 25 are aligned with each other in the radial direction.

Next, the retaining pin 23 is inserted from one side 24a in the radial direction of the first engaging hole 24 up to the other side 24b of the first engaging hole 24 through the second engaging hole 25. In this way, both end portions 23a and 23b of the retaining pin 23 are slightly press-fixed to both of the end portions 24a and 24b of the first engaging hole 24, and the retaining pin 23 can be connected and fixed to the rear side shaft 9 and the second tube 11.

Therefore, in the same way as the second embodiment, when the front side shaft 8 relatively moves in the axial direction with respect to the rear side shaft 9, a shearing direction force acts on each of the end portions 24a and 24b of the first engaging hole 24, then a predetermined shearing force or greater acts on the retaining pin 23. Both of the end portions 23a and 23b of the retaining pin 23, which are slightly press-fixed to both of the end portions 24a and 24b of the first engaging hole 24, are then fractured from both end edge positions of the second engaging hole 25, and the front side shaft 8 moves to a right direction in FIG. 6. Thus, in the same manner as the second embodiment, the seal ring 15 is pushed out by the inside wall surface 14b of the annular seal groove 14 and moves to the outer peripheral surface of the non-seal surface 21. Thus, it is possible to sufficiently prevent the seal ring 15 from being caught between the both splines 12 and 16. As a result, an excellent shock absorbing performance can be gained.

In the fourth embodiment, the outer diameter of the retaining pin 23 is formed to be larger than the other embodiments, thereby responding to a further large axial direction input-load. The present embodiment can thus be applied according to a size of the vehicle.

Fifth Embodiment

FIG. 7 shows a fifth embodiment. For example, an accommodating and fitting position of the seal ring 15 is changed to an outer peripheral side of the rear side shaft 9 instead of an inner peripheral side of the front side shaft 8.

That is, a first annular seal groove 26 to accommodate and hold the seal ring 15 therein is formed at a position corresponding to the outer peripheral seal surface of the rear side shaft 9. Further, a second annular seal groove 28 is formed between an inner peripheral seal surface 27 of the second tube 11 of the front side shaft 8 and the female spline 12, namely, at a vicinity of the side of the first annular seal groove 26 in the axial direction.

The first annular seal groove 26 is formed into a substantially bracket-shape in a cross section in a side position, toward the center bearing 5, of the outer peripheral seal surface 29 that is formed at an edge side, toward the center bearing 5, of the male spline 16, and accommodates and holds the inner peripheral portion of the seal ring 15.

While the seal ring 15 is held in the annular seal groove 26, the outer peripheral portion of the seal ring 15 elastically contacts the inner peripheral seal surface 27, so that the seal ring 15 is kept in the pressed state between the first annular groove 26 and the inner peripheral seal surface 27. With this structure, the sealing performance is ensured.

Here, such components as the retainer and the retaining pin provided in the first embodiment are not provided.

The second annular seal groove 28 is also formed into a substantially bracket-shape in a cross section. The second annular seal groove 28 is placed in a position opposite to the outer peripheral seal surface 29 in the radial direction.

Accordingly, in the same way as the above mentioned embodiments, as shown by an arrow of FIG. 7, when the input-load is exerted in the axial direction on the front side shaft 8 and the front side shaft 8 relatively moves in the axial direction with respect to the rear side shaft 9, in an early stage of this movement, the inner peripheral seal surface 27 of the front side shaft 8 moves while slide-contacting an outer peripheral edge of the seal ring 15. Further, when the second annular seal groove 28 reaches a position of the seal ring 15, the seal ring 15 is inserted into and held in the second annular seal groove 28 instantaneously by an elastic reaction force of the seal ring 15. In short, the seal ring 15 is carried by being fitted into the second annular seal groove 28 from the first annular seal groove 26 with movement of the front side shaft 8, and the seal ring 15 is held in the pressed state between a bottom surface of the second annular seal groove 28 and the outer peripheral seal surface 29.

Next, when the front side shaft 8 continues moving to the same direction, as shown by a dashed line in FIG. 7, the seal ring 15 moves to a direction moving away from the both splines 12 and 16 while slide-contacting the outer peripheral surface of the rear side shaft 9, with the seal ring 15 held in the second annular seal groove 28.

Therefore, in the same way as each embodiment, it is possible to sufficiently prevent the seal ring 15 from being caught between the both splines 12 and 16. As a result, the excellent shock absorbing performance can be gained.

In the fifth embodiment, only the first and second annular seal grooves 26 and 28 are provided, but such components as the retainer and the retaining pin provided in the first embodiment are not provided. This facilitates manufacturing work and assembly work.

The present invention is not limited to a configuration of each of the embodiments. For example, the present invention can be applied as a power transmission shaft to a ship. Moreover, depth of the annular seal groove and a diameter of a cross section of the seal ring of the present invention can be flexibly changed depending on the power transmission shaft and its outer diameter size.

In the following, technical ideas which are not disclosed in scope of claims and can be understood from the embodiments described above are explained.

[a] In the power transmission shaft,
the sealing effect removal portion is formed by a non-seal surface having a smaller diameter than the outer diameter of the outer peripheral seal surface of the shaft member or a non-seal surface having a larger diameter than an inner diameter of the inner peripheral seal surface of the cylindrical member.

The sealing effect removal portion can be formed by only changing a size of an outer diameter of the outer peripheral seal surface or the inner peripheral seal surface. Therefore, its working process becomes easy.

[b] In the power transmission shaft according to [a],
the non-seal surface is formed in an area, where the seal member moves when the shaft member and the cylindrical member relatively move and retract, on the outer peripheral surface or the inner peripheral seal surface.

[c] In the power transmission shaft according to [b],
the non-seal surface is formed continuously from the outer peripheral seal surface or the inner peripheral seal surface in the axial direction.

The sliding resistance can be quickly reduced immediately after the seal member starts sliding because the non-seal surface is formed continuously from each of the seal surfaces.

[d] In the power transmission shaft,
each of the seal surfaces is formed on a surface where the male spline of the shaft member is not formed and on a surface where the female spline of the cylindrical member is not formed.

[e] In the power transmission shaft,
the engaging holes are formed along the radial direction between the male spline and the outer peripheral seal surface of the shaft member and between the female spline and the inner peripheral seal surface of the cylindrical member, and the retaining pin is inserted into and fixed between the both engaging holes.

When the cylindrical member moves in the axial direction, the retaining pin prevents the seal member from moving to a direction of a portion where each of the splines is formed. Therefore, it is possible to prevent the seal member from being caught in the splines, then a sliding performance improves.

[f] In the power transmission shaft,
a length of the sealing effect removal portion in the axial direction is formed to be within a range that is equal to or longer than a predetermined sliding length of the both splines in the axial direction when the cylindrical member moves and retracts with respect to the shaft member.

The sliding resistance of the seal member can be efficiently suppressed because the length of the sealing effect removal portion in the axial direction is sufficiently secured.

[g] In the power transmission shaft,
the shaft member has a large diameter portion on which the male spline is formed, a middle diameter portion which is adjacent to the large diameter portion and on which the outer peripheral seal surface is formed and a small diameter portion which is adjacent to the middle diameter portion and on which the non-seal surface is formed, and the seal member is set from the small diameter portion side.

Since the seal member can be set from the small diameter portion side, it is possible to easily set the seal member.

[h] In a propeller shaft for a vehicle,
the shaft member has a large diameter portion on which the male spline is formed, a middle diameter portion which is adjacent to the large diameter portion and on which the outer peripheral seal surface is formed and a small diameter portion which is adjacent to the middle diameter portion and on which the non-seal surface is formed, and the seal member is set from the small diameter portion side.

[i] In the propeller shaft for the vehicle according to [h],
a length of the non-seal surface in the axial direction is formed to be within a range that is equal to or longer than the sliding length of the both splines in the axial direction when the cylindrical member moves and retracts with respect to the shaft member.

[j] In the propeller shaft for the vehicle according to [i],
the small diameter portion is formed continuously from an axial direction end edge of the outer peripheral seal surface or the inner peripheral seal surface.

EXPLANATION OF SIGNS

1: first shaft
2: second shaft

8: front side shaft (cylindrical member)
9: rear side shaft (shaft member)
10: first tube
11: second tube
12: female spline
13 and 18: first and second engaging holes
14: annular seal groove
14a: opening portion
14b: inner side wall surface
15: seal ring (seal member)
16: male spline
17: outer peripheral seal surface
19: retainer
20 and 23: retaining pins
21: non-seal surface
22: oil seal (seal member)
24 and 25: first and second engaging holes
26: first annular seal groove
27: inner peripheral seal surface
28: second annular seal groove
29: outer peripheral seal surface The entire contents of Japanese Patent Application No. 2014-189596 filed on Sep. 18, 2014 are incorporated herein by reference.

The invention claimed is:

1. A power transmission shaft comprising:
a shaft member having, on an outer peripheral surface thereof, a male spline;
a cylindrical member having, on an inner peripheral surface thereof, a female spline, the cylindrical member being spline-engaged with the shaft member by a first end side of the shaft member being inserted into the cylindrical member from an end side of the cylindrical member, and an axial direction shock being absorbed by sliding of the splines;
a seal member provided in a pressed state between an outer peripheral seal surface formed on the outer peripheral surface of the shaft member and an inner peripheral seal surface formed on the inner peripheral surface of the cylindrical member; and
a retaining pin, one side of which is engaged with one engaging hole formed at the shaft member, and another side of which is engaged with another engaging hole formed at the cylindrical member,
the outer peripheral seal surface being positioned at a second end side of the shaft member with respect to the male spline,
the inner peripheral seal surface being positioned at the end side of the cylindrical member with respect to the female spline, and
the engaging holes being respectively positioned between a spline forming portion where splines of the shaft member and the cylindrical member are formed and the seal surfaces of the shaft member and the cylindrical member.

2. The power transmission shaft as claimed in claim 1, wherein:
the shaft member is provided, at the second end side with respect to the male spline on the outer peripheral surface thereof, with a non-seal surface whose diameter is smaller than that of the outer peripheral seal surface.

3. The power transmission shaft as claimed in claim 2, wherein:
the non-seal surface is formed continuously with the outer peripheral seal surface in an axial direction.

4. The power transmission shaft as claimed in claim 3, wherein:
the seal surface of the shaft member is formed on the outer peripheral surface where no male spline is formed, and
the seal surface of the cylindrical member is formed on the inner peripheral surface where no female spline is formed.

5. The power transmission shaft as claimed in claim 4, wherein:
the non-seal surface is formed at the shaft member within a range that is equal to or larger than a predetermined sliding area of the shaft member and the cylindrical member by the sliding of the splines.

6. The power transmission shaft as claimed in claim 2, wherein:
the seal member is a ring-shaped seal ring,
the shaft member has, from the first end side of the shaft member:
a large diameter male spline forming portion where the male spline is formed;
a middle diameter surface whose diameter is smaller than that of the male spline forming portion; and
a small diameter surface whose diameter is smaller than that of the middle diameter surface, and
the outer peripheral seal surface is formed on the middle diameter surface, and the non-seal surface is formed on the small diameter surface.

7. The power transmission shaft as claimed in claim 1, wherein:
a seal accommodating portion that accommodates therein the seal member is formed by a large diameter portion that is formed at the end side of the cylindrical member and a retainer that closes the large diameter portion.

8. A power transmission shaft, comprising:
a shaft member having, on an outer peripheral surface thereof, a male spline;
a cylindrical member having, on an inner peripheral surface thereof, a female spline that is engaged with the male spline;
a length adjusting portion that adjusts a length of a spline-engagement of the male and female splines in an axial direction;
a seal member having a sealing effect, the seal member provided in a pressed state between an outer peripheral seal surface formed on the outer peripheral surface of the shaft member and an inner peripheral seal surface formed on the inner peripheral surface of the cylindrical member;
a sealing effect removal portion that removes the sealing effect of the seal member when the length is adjusted by the length adjusting portion; and
a retaining pin, one side of which is engaged with one engaging hole formed at the shaft member, and another side of which is engaged with another engaging hole formed at the cylindrical member,
wherein the engaging holes are respectively positioned between a spline forming portion where splines of the shaft member and the cylindrical member are formed and the seal surfaces of the shaft member and the cylindrical member.

9. The power transmission shaft as claimed in claim 8, wherein:
the sealing effect removal portion is a non-seal surface whose diameter is smaller than that of the outer peripheral seal surface of the shaft member.

10. The power transmission shaft as claimed in claim 9, wherein:

the non-seal surface is formed in an area, where the seal member moves when the length adjusting portion retracts, on the outer peripheral seal surface.

11. The power transmission shaft as claimed in claim 10, wherein:
the non-seal surface is formed continuously with the outer peripheral seal surface in an axial direction.

12. The power transmission shaft as claimed in claim 8, wherein:
the seal surface of the shaft member is formed on the outer peripheral surface where no male spline is formed, and
the seal surface of the cylindrical member is formed on the inner peripheral surface where no female spline is formed.

13. The power transmission shaft as claimed in claim 8, wherein:
the sealing effect removal portion is formed at the shaft member within a range that is equal to or larger than a predetermined sliding area of the shaft member and the cylindrical member by sliding of the splines.

14. The power transmission shaft as claimed in claim 8, wherein:
the seal member is a ring-shaped seal ring,
the shaft member has, from a first end side of the shaft member:
a large diameter male spline forming portion where the male spline is formed;
a middle diameter surface whose diameter is smaller than that of the male spline forming portion; and
a small diameter surface whose diameter is smaller than that of the middle diameter surface, and
the outer peripheral seal surface is formed on the middle diameter surface, and the non-seal surface is formed on the small diameter surface.

15. A propeller shaft for a vehicle comprising:
a cylindrical member whose one end side is connected to the vehicle through a first joint member, the cylindrical member having, on an inner peripheral surface thereof, a female spline;
a shaft member whose second end side is connected to the vehicle through a second joint member, the shaft member having, on an outer peripheral surface thereof, a male spline that is engaged with the female spline, the cylindrical member and the shaft member being spline-engaged with each other by a first end side of the shaft member being inserted into the cylindrical member, and a length of the spline-engagement being adjusted by sliding of the splines in an axial direction in response to an input from a direction of the first or second joint member; and
a seal member provided in a pressed state with a predetermined tightness between an outer peripheral seal surface formed on the outer peripheral surface of the shaft member and an inner peripheral seal surface formed on the inner peripheral surface of the cylindrical member, wherein:
when the splines relatively slide in the axial direction, the seal member contacting at least one of the inner or outer peripheral seal surfaces with a smaller tightness than the predetermined tightness,
the seal member is a ring-shaped seal ring,
the shaft member has, from the first end side of the shaft member:
a large diameter male spline forming portion where the male spline is formed;
a middle diameter portion whose diameter is smaller than that of the male spline forming portion; and
a small diameter portion whose diameter is smaller than that of the middle diameter portion,
the outer peripheral seal surface is formed on the middle diameter portion, and
when the splines relatively slide in the axial direction, the seal member contacts the small diameter portion.

16. The propeller shaft for the vehicle as claimed in claim 15, wherein:
the small diameter portion is formed at the shaft member within a range that is equal to or larger than a predetermined sliding area of the shaft member and the cylindrical member by sliding of the splines.

17. The propeller shaft for the vehicle as claimed in claim 16, wherein:
the small diameter portion is formed continuously with the outer peripheral seal surface.

18. A power transmission shaft comprising:
a shaft member having, on an outer peripheral surface thereof, a male spline;
a cylindrical member having, on an inner peripheral surface thereof, a female spline, the cylindrical member being spline-engaged with the shaft member by a first end side of the shaft member being inserted into the cylindrical member from an end side of the cylindrical member, and an axial direction shock being absorbed by sliding of the splines; and
a seal member provided in a pressed state between an outer peripheral seal surface formed on the outer peripheral surface of the shaft member and an inner peripheral seal surface formed on the inner peripheral surface of the cylindrical member, wherein:
the outer peripheral seal surface is positioned at a second end side of the shaft member with respect to the male spline,
the inner peripheral seal surface is positioned at the end side of the cylindrical member with respect to the female spline,
the shaft member is provided, at the second end side with respect to the male spline on the outer peripheral surface thereof, with a non-seal surface whose diameter is smaller than that of the outer peripheral seal surface,
the seal member is a ring-shaped seal ring,
the shaft member has, from the first end side of the shaft member:
a large diameter male spline forming portion where the male spline is formed;
a middle diameter surface whose diameter is smaller than that of the male spline forming portion; and
a small diameter surface whose diameter is smaller than that of the middle diameter surface, and
the outer peripheral seal surface is formed on the middle diameter surface, and the non-seal surface is formed on the small diameter surface.

19. The power transmission shaft as claimed in claim 18, wherein:
the non-seal surface is formed continuously with the outer peripheral seal surface in an axial direction.

20. The power transmission shaft as claimed in claim 19, wherein:
the seal surface of the shaft member is formed on the outer peripheral surface where no male spline is formed, and
the seal surface of the cylindrical member is formed on the inner peripheral surface where no female spline is formed.

21. The power transmission shaft as claimed in claim 20, wherein:

the non-seal surface is formed at the shaft member within a range that is equal to or larger than a predetermined sliding area of the shaft member and the cylindrical member by the sliding of the splines.

22. The power transmission shaft as claimed in claim 18, wherein:
a seal accommodating portion that accommodates therein the seal member is formed by a large diameter portion that is formed at the end side of the cylindrical member and a retainer that closes the large diameter portion.

23. The power transmission shaft as claimed in claim 18, further comprising:
a retaining pin, one side of which is engaged with one engaging hole formed at the shaft member, and another side of which is engaged with another engaging hole formed at the cylindrical member,
wherein the engaging holes are respectively positioned between a spline forming portion where splines of the shaft member and the cylindrical member are formed and the seal surfaces of the shaft member and the cylindrical member.

24. A power transmission shaft, comprising:
a shaft member having, on an outer peripheral surface thereof, a male spline;
a cylindrical member having, on an inner peripheral surface thereof, a female spline that is engaged with the male spline;
a length adjusting portion that adjusts a length of a spline-engagement of the male and female splines in an axial direction;
a seal member having a sealing effect, the seal member provided in a pressed state between an outer peripheral seal surface formed on the outer peripheral surface of the shaft member and an inner peripheral seal surface formed on the inner peripheral surface of the cylindrical member; and
a sealing effect removal portion that removes the sealing effect of the seal member when the length is adjusted by the length adjusting portion, wherein:
the seal member is a ring-shaped seal ring,
the shaft member has, from one end side of the shaft member:
a large diameter male spline forming portion where the male spline is formed;
a middle diameter surface whose diameter is smaller than that of the male spline forming portion; and
a small diameter surface whose diameter is smaller than that of the middle diameter surface, and
the outer peripheral seal surface is formed on the middle diameter surface, and the non-seal surface is formed on the small diameter surface.

25. The power transmission shaft as claimed in claim 24, wherein:
the sealing effect removal portion is a non-seal surface whose diameter is smaller than that of the outer peripheral seal surface of the shaft member.

26. The power transmission shaft as claimed in claim 25, wherein:
the non-seal surface is formed in an area, where the seal member moves when the length adjusting portion retracts, on the outer peripheral seal surface.

27. The power transmission shaft as claimed in claim 26, wherein:
the non-seal surface is formed continuously with the outer peripheral seal surface in an axial direction.

28. The power transmission shaft as claimed in claim 24, wherein:
the seal surface of the shaft member is formed on the outer peripheral surface where no male spline is formed, and
the seal surface of the cylindrical member is formed on the inner peripheral surface where no female spline is formed.

29. The power transmission shaft as claimed in claim 24, further comprising:
a retaining pin, one side of which is engaged with one engaging hole formed at the shaft member, and another side of which is engaged with another engaging hole formed at the cylindrical member,
wherein the engaging holes are respectively positioned between a spline forming portion where splines of the shaft member and the cylindrical member are formed and the seal surfaces of the shaft member and the cylindrical member.

30. The power transmission shaft as claimed in claim 24, wherein:
the sealing effect removal portion is formed at the shaft member within a range that is equal to or larger than a predetermined sliding area of the shaft member and the cylindrical member by sliding of the splines.

* * * * *